(12) United States Patent
Blinick et al.

(10) Patent No.: US 9,152,599 B2
(45) Date of Patent: Oct. 6, 2015

(54) MANAGING CACHE MEMORIES (71) Applicant: International Business Machines Corporation, Armonk, NY (US)

(72) Inventors: Stephen L. Blinick, Tucson, AZ (US); Lawrence Y. Chiu, San Jose, CA (US); Evangelos S. Eleftheriou, Rueschlikon (CH); Robert Haas, Rueschlikon (CH); Yu-Cheng Hsu, Tucson, AZ (US); Xiao-Yu Hu, Rueschlikon (CH); Ioannis Koltsidas, Rueschlikon (CH); Paul H. Muench, San Jose, CA (US); Roman Pletka, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 13/920,669

(22) Filed: Jun. 18, 2013

(65) Prior Publication Data

US 2013/0346538 A1    Dec. 26, 2013

(30) Foreign Application Priority Data

Jun. 21, 2012 (GB) .................................. 1210995.5

(51) Int. Cl.
*G06F 15/16* (2006.01)
*G06F 15/167* (2006.01)
*G06F 12/00* (2006.01)

(52) U.S. Cl.
CPC .............. *G06F 15/167* (2013.01); *G06F 12/00* (2013.01)

(58) Field of Classification Search
CPC . G06F 15/16; G06F 17/30445; G06F 15/167; H04L 67/025; H04L 67/2857; H04L 29/08801; H04L 67/2842
USPC .................... 709/213, 217; 707/603, 827
See application file for complete search history.

(56) References Cited

U.S. PATENT DOCUMENTS 7,774,548 B2    8/2010  Rao et al.
7,792,885 B2 *  9/2010  Piper et al. .................... 707/600
(Continued)

FOREIGN PATENT DOCUMENTS

WO          03085560 A1    10/2003

OTHER PUBLICATIONS

K. Molloy et al., "Method and Model to Assess the Performance of Clustered Databases: The Oracle RAC Case," Proc. 2010 Computer Measurement Group Conf., Dec. 2010, FL, p. 1-12.
(Continued)

*Primary Examiner* — Tesfay Yohannes
(74) *Attorney, Agent, or Firm* — Cantor Colburn LLP (57) ABSTRACT

A method for managing cache memories includes providing a computerized system including a shared data storage system (CS) configured to interact with several local servers that serve applications using respective cache memories, and access data stored in the shared data storage system; providing cache data information from each of the local servers to the shared data storage system, the cache data information comprising cache hit data representative of cache hits of each of the local servers, and cache miss data representative of cache misses of each of the local servers; aggregating, at the shared data storage system, at least part of the cache hit and miss data received and providing the aggregated cache data information to one or more of the local servers; and at the local servers, updating respective one or more cache memories used to serve respective one or more applications based on the aggregated cache data information.

12 Claims, 2 Drawing Sheets

(56) References Cited

U.S. PATENT DOCUMENTS

| | | | |
|---|---|---|---|
| 7,930,481 B1 | 4/2011 | Nagler et al. | |
| 8,719,320 B1* | 5/2014 | Brooker et al. | 707/827 |
| 8,799,209 B2* | 8/2014 | Bakalash et al. | 707/603 |
| 8,886,760 B2* | 11/2014 | Jogand-Coulomb et al. | 709/219 |
| 8,972,799 B1* | 3/2015 | Brooker et al. | 714/47.2 |
| 9,037,921 B1* | 5/2015 | Brooker et al. | 714/47.1 |
| 2002/0004887 A1 | 1/2002 | Kubo | |
| 2004/0186861 A1* | 9/2004 | Phatak | 707/200 |
| 2006/0230099 A1 | 10/2006 | Maya et al. | |
| 2008/0244184 A1* | 10/2008 | Lewis et al. | 711/130 |
| 2009/0292882 A1 | 11/2009 | Li et al. | |
| 2011/0022798 A1* | 1/2011 | Hou et al. | 711/118 |
| 2012/0179907 A1* | 7/2012 | Byrd et al. | 713/156 |

OTHER PUBLICATIONS

Seung Woo Son, et al, "Topology-Aware I/O Caching for Shared Storage Systems," Office of Science, Aug. 2009, pp. 1-9.

Wikipedia, [online]; [retrieved on May 10, 2013]; retrieved from the Internet http://en.wikipedia.org/wiki/Storage_area_network Wikipedia, "Storage Area Network," Apr. 2013, pp. 1-5.

\* cited by examiner

MANAGING CACHE MEMORIES

PRIORITY

This application claims priority to Great Britain Patent Application No. 1210995.5. filed Jun. 21, 2012. and all the benefits accruing therefrom under 35 U.S.C. §119. the contents of which in its entirety are herein incorporated by reference.

BACKGROUND

The invention relates in general to the field of computerized methods and systems for managing cache memories, in particular in a storage area network (SAN) environment.

A storage area network (SAN) is a dedicated network that provides access to consolidated, block level data storage. Such networks are primarily used to make storage devices (e.g., disk arrays or tape libraries) accessible to servers; so that these devices appear as locally attached to the operating system. A SAN typically has its own network of storage devices, which are generally not accessible through the local area network by other devices. A SAN does not provide file abstraction, only block-level operations. However, file systems built on top of SANs do provide file-level access (see e.g., Wikipedia contributors, 'Storage area network', Wikipedia, The Free Encyclopedia, 21 May 2012).

More generally, there are several known environments wherein several, local application servers (i.e., using respective cache memories for serving respective applications), are configured to interact with a shared data storage system, so that they can access data stored on the shared storage pool. How such systems manage cache memory is typically implemented as follows: local cache misses are reported by the local servers to the shared data storage system; the latter provides the missing data, in response; and it further consolidates and uses the cache miss data received for caching/tiering purposes, i.e., data placement purposes.

This, for example, is what done in a SAN environment. Clearly, the shared data storage system plays a central role; it is therefore sometimes referred to as a "central system".

In a typical SAN environment, multiple application servers are connected to the shared data storage system via a standard block-level access interface (data are typically accessed in fixed size blocks of e.g., 512 to 528 bytes). The shared storage pool is managed by a SAN storage server, such as the IBM DS8000. The SAN storage server often uses large caches to increase system throughput and to reduce access latency, while, at the same time, each application server may use caches as well to increase the application agility in terms of I/O efficiency and to reduce consumption of the SAN server's bandwidth. As it can be realized, the caches at the application servers (also referred to as "local caches" hereafter) and the cache at the SAN storage server operate independently: there is no coordination among them. The same conclusion generally holds for more general system architecture as described above, i.e., wherein local application servers interact with a shared data storage system, to access data stored on the shared storage pool.

SUMMARY

In one embodiment, a method for managing cache memories includes providing a computerized system comprising a shared data storage system (CS) and several local servers, wherein the shared data storage system is configured to interact with the local servers, the local servers serve applications using respective cache memories, and each of the local servers accesses data stored in the shared data storage system; providing cache data information from each of the local servers to the shared data storage system, the cache data information comprising cache hit data representative of cache hits of each of the local servers; and cache miss data representative of cache misses of each of the local servers; aggregating, at the shared data storage system, at least part of the cache hit data and the cache miss data received into aggregated cache data information and providing the aggregated cache data information to one or more of the local servers; and at the one or more of the local servers, updating respective one or more cache memories used to serve respective one or more applications based on the aggregated cache data information provided.

In another embodiment, a method for managing cache memories, includes providing a local server serving an application using a cache memory, the local server configured to interact with a shared data storage system, the shared data storage system configured to interact with several local servers that access data stored in the shared data storage system; at the local server, making cache data information available to the shared data storage system, the cache data information comprising cache hit data representative of cache hits of the each local server, and cache miss data representative of cache misses of the each local server; receiving from the shared data storage system aggregated cache data information obtained by aggregating cache hit data and cache miss data obtained from several local servers; and updating the cache memory based on the received aggregated cache data information.

In another embodiment, a method for managing cache memories, includes providing a computerized system comprising a shared data storage system configured to interact with several local servers that serve applications using respective cache memories, wherein the local servers accesses data stored in the shared data storage system, upon request of the applications, at the shared data storage system, receiving from each of the local servers, in any order, cache hit data representative of cache hits of the each local server, and cache miss data representative of cache misses of the each local server; aggregating at least part of the cache hit data received and the cache miss data received into aggregated cache data information; and providing the aggregated cache data information to one or more of the local servers for subsequent updating of respective cache memories used to serve respective applications based on the aggregated cache data information.

DETAILED DESCRIPTION

According to a first aspect (i.e., a global aspect), the present invention is embodied as a method for managing cache memories, the method including providing a computerized system comprising a shared data storage system and several local servers, wherein: the shared data storage system is configured to interact with the local servers; the local servers serve applications using respective cache memories; and each of the local servers accesses data stored in the shared data storage system. The method further including providing cache data information from each of the local servers to the shared data storage system, the cache data information provided comprising: cache hit data representative of cache hits of each of the local servers; and cache miss data representative of cache misses of each of the local servers; aggregating, at the shared data storage system, at least part of the cache hit data and the cache miss data received into aggregated cache data information and providing the aggregated cache data information to one or more of the local servers; and at the one or more of the local servers, updating respective one or more cache memories used to serve respective one or more applications based on the aggregated cache data information provided.

According to a second aspect (i.e., as seen from a local server), the invention is embodied as a method for managing cache memories, comprising: providing a local server serving an application using a cache memory, the local server being further configured to interact with a shared data storage system, the latter configured to interact with several local servers that access data stored in the shared data storage system, the method further comprising, at the local server: making cache data information available to the shared data storage system, the cache data information comprising: cache hit data representative of cache hits of the each local server; and cache miss data representative of cache misses of the each local server; receiving from the shared data storage system aggregated cache data information obtained by aggregating cache hit data and cache miss data obtained from several local servers; and updating the cache memory based on the received aggregated cache data information.

According to a third aspect (i.e., as seen from the shared data storage system), the invention is embodied as a method for managing cache memories, comprising: providing a computerized system comprising a shared data storage system configured to interact with several local servers that serve applications using respective cache memories, wherein the local servers accesses data stored in the shared data storage system, upon request of the applications, the method further comprising, at the shared data storage system: receiving from each of the local servers, in any order: cache hit data representative of cache hits of the each local server; and cache miss data representative of cache misses of the each local server; aggregating at least part of the cache hit data received and the cache miss data received into aggregated cache data information; and providing the aggregated cache data information to one or more of the local servers for subsequent updating of respective cache memories used to serve respective applications based on the aggregated cache data information.

Aggregating further comprises sorting the cache hit data and the cache miss data according to occurrences of the cache hit data and the cache miss data, such that a structure of the aggregated cache data information obtained reflects the sorting.

According to embodiments, updating a cache memory is carried out asynchronously with respect to requests to the cache memory from a respective application served by a respective local server.

Updating a cache memory comprises selecting subsets of data in the aggregated cache data information and populating the cache memory according to the selected subsets of data.

In exemplary embodiments, updating a cache memory comprises: selecting at least two distinct subsets of data in the aggregated cache data information; instructing to populate, without delay, the cache memory with data corresponding to one of the distinct subsets of data; and instructing to place data corresponding to another one of the distinct subsets of data in a watch-list, and the method further comprises: monitoring data in the watch-list to determine data to be populated in the cache memory; and populating the data accordingly determined in the cache memory.

In embodiments, the method further comprises: instructing to place additional data corresponding to local cache miss data in the watch-list, the local cache miss data being representative of cache misses collected by the local server independently from the aggregated cache data information, such that both the local cache miss data and the data corresponding to the second one of the two distinct subsets of data can be monitored to determine which data is to be populated in the cache memory.

The watch-list comprises a circular list of cached objects and monitoring data in the watch-list comprises evicting an oldest cached object, which has not been requested to be accessed during a given period of time, from the circular list.

In embodiments, the method further comprises filtering data that already reside in cache memory before populating a cache memory with such data.

The aggregated cache data information may for instance be aggregated at a granularity larger than a granularity used at any subsequent updating of cache memory.

According to other aspects, the invention is embodied as a computerized system, comprising one or more components as described above (i.e., at least a shared data storage system and/or a (local) server), the system configured to perform each of the operations performed by the one or more components, in a method according to any one of the above embodiments.

Finally, according to still another aspect, the invention can be embodied as a computer program product for managing cache memories, the computer program product comprising a computer-readable storage medium having computer-readable program code embodied therewith, the computer-readable program code configured to implement each of the operations of a method according to any one of the above embodiments.

Methods, systems and components thereof embodying the present invention will now be described, by way of non-limiting examples, and in reference to the accompanying drawings.

The following description is structured as follows. First, general embodiments and high-level variants are described (sect. 1). The next section addresses more specific embodiments and technical implementation details (sect. 2).

1. General Embodiments and High-level Variants

In this section, general aspects of the invention are described, which concern methods for managing cache memories. Since the present invention concerns interactions between clients LS1, LS2 and a central server CS, i.e., within a client-server architecture, see FIG. 1, different descriptions of the invention can be given, depending on the viewpoint adopted. Thus, in the following, general aspects of the invention are first described, as embodied in a global system comprising both the clients and the server CS. Then, aspects of the same invention as seen from the viewpoint of a client or the server CS are discussed. Of course, these aspects differ only in the viewpoint adopted (i.e., global or as seen from one of the components of FIG. 1), and refer to one and a same invention.

Figure 1:
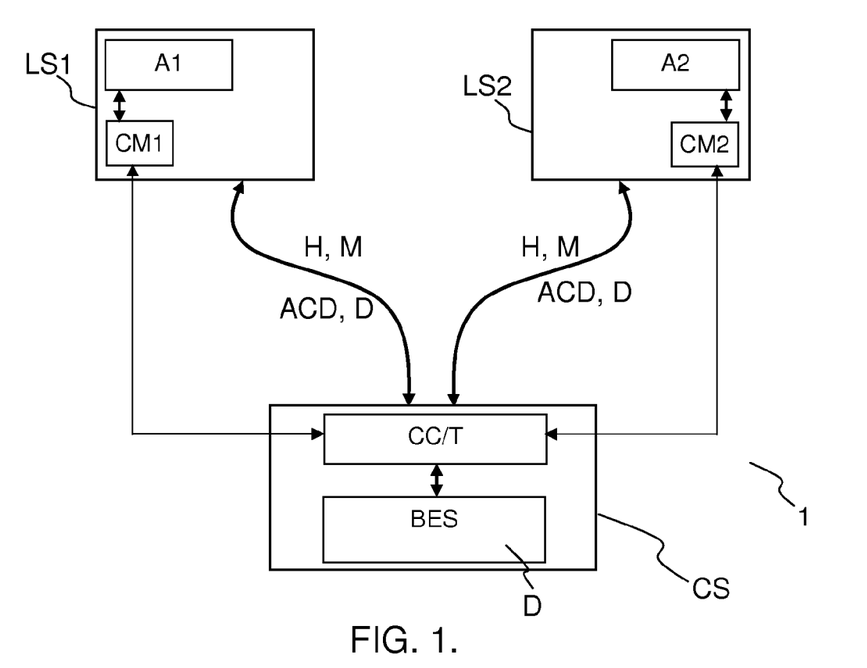
FIG. 1 schematically represents a computerized system adapted to implement methods according to embodiments of the invention.
Figure 2:
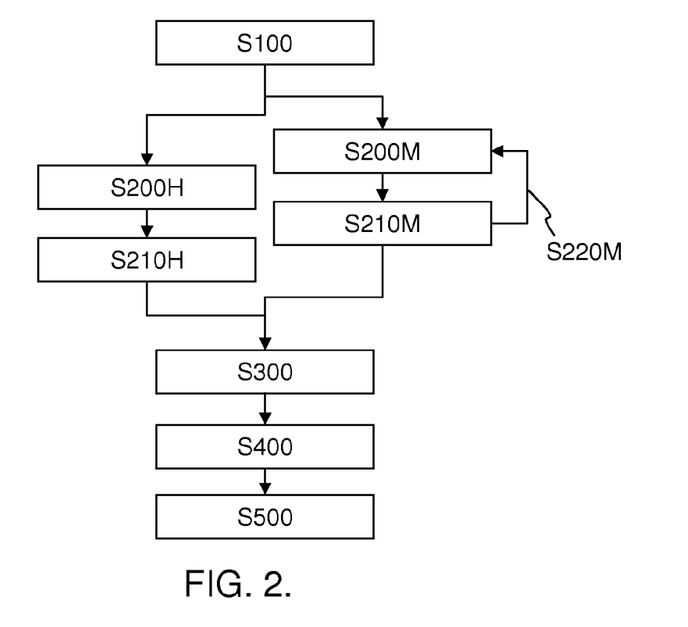
FIG. 2 is a flowchart representing high-level operations as involved in embodiments.

First, referring to FIGS. 1-2, the method generally operates in a computerized system 1 that comprises, in a global point of view, both the server and the clients, namely a shared data storage system CS and several local servers LS1, LS2. Thus, formally speaking, a first block S100 of the method accordingly consists of providing a computerized system 1 such as illustrated in FIG. 1. In this system 1, the shared data storage system CS is configured to interact with several local servers, i.e., at least two local servers LS1, LS2 in a minimal configuration. The latter serve applications A1, A2 using respective cache memories CM1, CM2. Each of the local servers may access data D stored in the shared data storage system. The data D is typically requested to be accessed by a local server upon request of the application it serves, just like in SAN environments, to which the present invention typically applies. The shared data storage system CS shall also be referred to as a "central system" below, for obvious reasons. This system CS is typically managed by a SAN storage server. Thus, both the local and central systems typically are "servers". The central system CS acts as a data server for the local servers LS1, LS2, while the local servers LSn serve respective applications An, using notably respective cache memories CMn. For the sake of disambiguation, the central system CS is referred to as a "system" while the local servers are referred to as "servers". Note that, in a minimal configuration, the computerized system comprises at least the central system CS, two local servers LS1, LS2, serving one or more applications, and using two respective cache memories (or more). It shall, in fact, be apparent to the skilled person that one local server may serve more than one application and this, using more than one cache.

Next, a second block consists of providing cache data information from each of the local servers LS1, LS2 to the central system CS. The cache data information typically consists of cache data statistics Like in prior art methods, such statistics concern cache misses M, i.e., data representative of cache misses of each of the local servers. A "cache miss" is known per se: it refers to a data access request that was not served from the cache memory CMn because some or all of the corresponding data were not cached at the time of the request.

However, unlike prior art methods, the cache data information that is forwarded to the central system in the present invention further includes cache hit data H, i.e., representative of cache hits of each of the local servers. A "cache hit" is also known per se, it corresponds to given data cached in a cache memory used by one or more applications and served in response to a data access request from that cache memory. The particular case of partial hits will be discussed later. Cache hits and misses are typically sent at different times, since cache misses likely need immediate response, contrary to cache hits, a thing that will be developed later too. Thus, one understands that the cache hit data are provided independently from the cache miss data, as illustrated by blocks S200H and S200M in FIG. 2.

What the central system CS does next is to aggregate, block S300, at least part of the cache hit data H and the cache miss data received into aggregated cache data information ACD. The aggregated cache data information may aggregate the actual data to be later populated in the local cache memories or, more simply, data identifiers. Once aggregated, the cache data information ACD can then be provided to one or more of the local servers, block S400. Of course, the local cache misses M, cache hits H and data D accessed shall likely differ from LS1 to LS2.

Finally, a local server shall proceed to update (block S500) the cache memory that it manages, based on the aggregated data ACD received, e.g., as soon as possible upon receiving the aggregated data from the central system.

Accordingly, local cache performance can be improved, owing to the more "global" knowledge captured in the ACD, i.e., knowledge of cache misses and hits that occur at several applications (including applications other than a particular local application that shall be provided with ACD). Thus, a given local cache shall be updated based on data which can likely be relevant to that given local cache, since they proved to be relevant at other locations. The global data are all the more relevant when some correlation exists between cache data relevant to one location and cache data relevant to another location. This is notably the case if the same application runs on several clients and touches the same data from the several clients. This is also the case when an application migrates from one server to some other (e.g., for failover). On the contrary, in the prior art systems, the local caches do not "see" the consolidated workload from all application servers and thus local caching decisions cannot be optimal, or at least not from a central viewpoint.

Note that if, by construction of blocks S200-S500, the aggregated data ACD includes global knowledge of cache data information, this does however not prevent the aggregated data ACD provided to a local server to be tailored, i.e., made specific for that server's. Namely, ACD data provided to one local server (e.g., LS1) may include cache data information captured from both LS1 and LS2, while still putting emphasis on data as primarily consolidated for LS1. This shall be developed later.

The invention is advantageously implemented in a SAN environment, where the central system CS makes use of a large cache and/or tiering mechanism. In addition, use is made of faster memory devices for storing cache, e.g. flash based SSDs, at the central system CS and/or at the local servers LS1, LS2.

So far, what has been described concerns general aspects of a method as seen from a global point of view. Now, the same method can be decomposed into operations as performed at one of the other of the involved components LS1, LS2, CS.

For example, from the viewpoint of a local server LS1, the method comprises the following operations: A local server LS1 shall:

make the cache data information available to the central system CS; the cache data information may for instance be sent or fetched, depending on the global system configuration;

then receive from the central system CS aggregated cache data information ACD, obtained as described above; and subsequently update its cache memory based on the received ACD.

Similarly, from the viewpoint of the central system CS, the method comprises:

receiving (or fetching) cache hit data H and cache miss data M from each of the local servers LS1, LS2, in any order (blocks S210H, S210M);

aggregating at least part of the cache hit data received and the cache miss data received into aggregated cache data information ACD, block S300; and providing in turn the ACD to one or more of the local servers LS1, LS2, block S400, for subsequent update of the cache memories CM1, CM2.

Performances of the above methods can be improved if the structure of the ACD provided to the local servers includes information as to the relevance of the data. To that aim, and referring to FIG. 4, the ACD aggregation block (i.e., block S300 in FIG. 2) may comprise data sorting operations, in embodiments. More precisely, the cache hit data and the cache miss data may be sorted according to occurrences of the cache hit data and the cache miss data. The occurrences can for instance be computed based on local records, or, from previous consolidation works at the central server CS. Thus, the structure of the aggregated cache data information ACD may reflect this sorting, possibly implicitly. For example, in FIG. 4, the data are sorted in ascending order of their occurrences, e.g., the hottest data (dotted rectangular segments in the ACD data of FIG. 4) are located at one end of the ACD data structure provided to the local servers.

Note that "occurrences" is to be understood in a broad sense; this can for instance reflect a frequency of occurrence of such data. It more generally reflects the propensity to occur over one or more time periods; it can simply be the history of the data. In this regard, it is noted that the process might for example need to take into account different time intervals and to correlate the cache data H, M to respective time intervals in order to compare relevant period of times, i.e., periods of time that are comparable, and to deduce comparable occurrences for the cache data H, M, prior to aggregating them into the ACD structure of FIG. 4. One sometimes speaks of cache data "consolidation", when this process is carried out for cache misses alone. In present embodiments of the invention, the originality of this optional block stems from the fact that both cache misses and cache hits are consolidated, which cache misses and hits pertain from several caches/applications/servers.

In addition, while the cache misses are typically immediately reported to the central server, cache hits need not be; they can for instance be collected locally and periodically reported, whence necessary adjustment to the cache misses frequencies. In variants, cache hits could be reported on-the-fly or still, once a quantitative threshold for cache hits has been reached at a local server.

Now, many advantageous design options can be contemplated. For example, the exchange of statistics between the local servers and the central system CS can be executed in-band or out-of-band. Also, when consolidating cache data, cache data for application requests pertaining to small bits of data may be grouped together in order to subsequently put data on SSDs; the cache data for requests pertaining to large bits may be grouped as well: data for larger requests are better placed on HDDs.

Depending on the time intervals considered, frequencies of occurrence of the cache data information ranges from an almost instantaneous frequency to an equivalent average frequency for an effective period of time, etc. Anyhow, what resorts from simulations performed by the present inventors is that sorting the ACD and structuring the ACD accordingly allows for improving long-term relevance of cache data, i.e., the local caches CM1, CM2 can be subsequently updated so as to cache data which have a better chance of being requested by the respective application A1, A2 over longer time periods.

Figure 3:
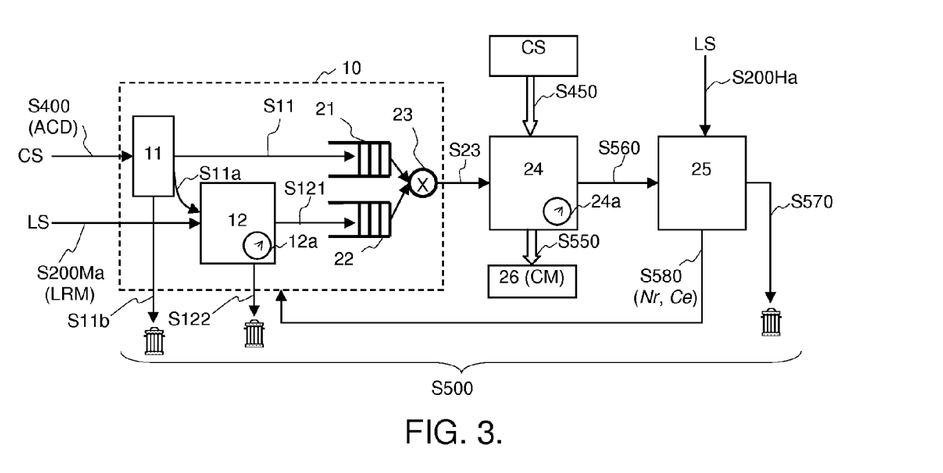
FIG. 3 is a diagram showing components and operations involved in a local cache population logic and population mechanism, according to embodiments.
Figure 4:
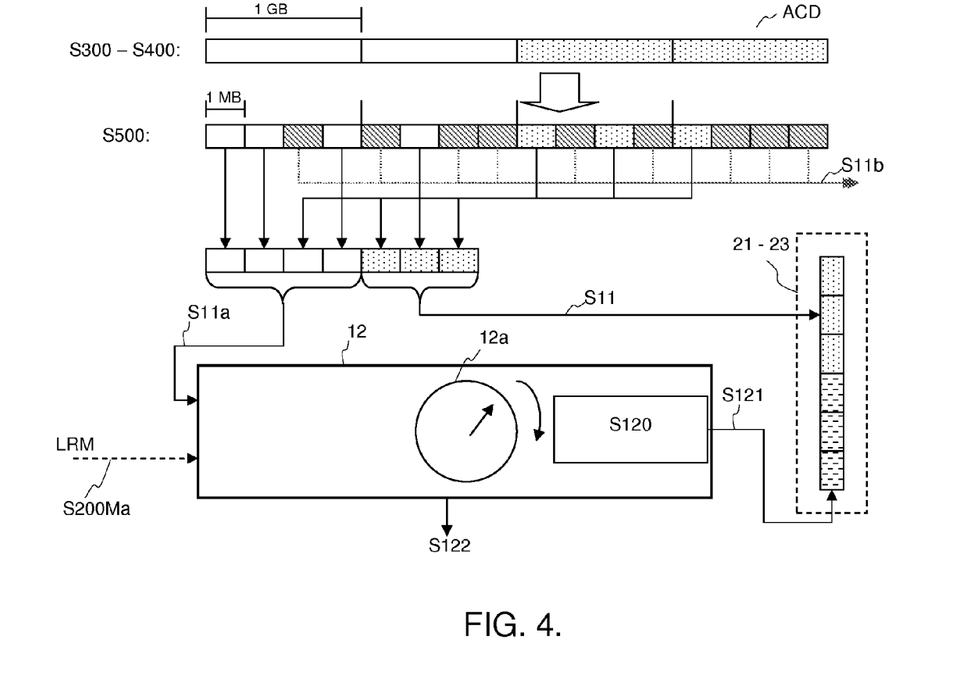
FIG. 4 is a diagram focusing on particular aspects of a local cache population logic as in FIG. 3, according to embodiments.

The cache memory updates are generally referred to by block S500 in FIG. 2. In FIGS. 3 and 4, the cache memory updates are decomposed into several subblocks, namely S11, S11a. S11b. S121, S122, S23, S450, and S550-S580, which subblocks are all implemented by a local server, or components thereof. These components decompose into a population logic 10 and a population mechanism 24. The former includes components 11, 12, 12a. 21, 22, 23. The population mechanism involves a data mover 24, interacting with a cache, e.g., a direct attach storage (DAS) cache memory 26 and a cache directory 25. A cache memory CM1, CM2 as meant in FIG. 1 comprises a minima a memory 26 (e.g., a DAS cache memory) as depicted in FIG. 3, also referred to as "CM".

Referring to FIGS. 3 and 4 altogether: the cache memory updates are carried out asynchronously. Namely, updates to a given cache CM1 are carried out asynchronously with respect to user requests to the cache memory CM1 from the corresponding application A1, i.e., served by the corresponding local server LS1. For example, the cache population mechanism can be governed by an asynchronous execution unit such as illustrated in FIG. 3, e.g., a dedicated software thread. This means that actual cache population blocks can be operated outside of the critical data path, i.e., the path containing blocks needed to deliver data to the applications from either the local cache or the central system. Thus, the update mechanism does not adversely impact the normal operation of the local caches.

More in details, cache memory updates typically involve data subset selection, i.e., subsets of data in the ACD provided to a local server are selected and the corresponding cache memory is then populated according to the selected subsets, as notably captured by the blocks S11, S11b. S121 in FIGS. 3-4. For instance, subsets of data in the received ACD may be selected, e.g., data subsets having the largest occurrences (or "hot data" for short), to directly populate the cache memory therewith (see block S11, FIG. 3 or 4). Concerning the remaining data subsets, they may be e.g., discarded, dropped, or still, monitored. In particular, some of the data subsets may be placed in a watch-list 12 for subsequent monitoring, as to be discussed below.

The data subset selection can be regarded as filtering. For data subset selection, use is advantageously made of the ACD structure, which can implicitly tell which data is hot, which data is not. In variants, some cache data can be explicitly marked as "must-have". Similarly, some data in the ACD could be marked as "must-not-have". Thus, a local population logic may proceed to select the data subsets according to their implicit or explicit ratings. For example, local server may not filter the "must-haves" (or at least not immediately); it may instead filter remaining data or could even ensure that "must-not-haves" will not be cached. Many other, intermediate strategies may be designed, as one skilled in the art may appreciate.

Now, since the data identified in the ACD may correspond to data already residing in cache, several stages of additional filters are advantageously implemented:

First, one may filter data already in cache out of the ACD as soon as it is received at a local server. For example, upon receiving the ACD, e.g., an ordered list of data extents, each corresponding to a 1 MB segment as in FIG. 4, a local cache logic 10 will first filter data fragments (or data fragment identifiers) out of those fragments that are already in cache, as illustrated in FIGS. 3 and 4, block S11b.

More generally, one may filter data already in cache at several points, e.g., at the filter 11 and/or at the data mover 24, etc.

In fact, what matters (when willing to filter out those data already in cache) is to ensure that those data are filtered before populating the cache memory therewith.

At present, different, concurrent routes can be contemplated for cache memory population. For example, two or more distinct subsets of data may be identified in an incoming ACD. As illustrated in FIGS. 3-4, the population logic 10 may instruct to populate (block S11), without delay, the cache memory CM1 with data corresponding to one of the distinct data subsets identified, while it instructs (block S11a) to place data corresponding to another one of the distinct data subsets identified in a watch-list 12. Data placed in the watch-list 12 can be subsequently monitored (block S120) to determine which data is to be populated S121 in cache. "Without delay"

means immediately or without further inquiry, e.g., within the minimal reasonable time allowed by logic and circuits. For instance, this might be governed by a maximum rate at which populations are allowed to be performed. In other words, the "hottest" data can be immediately populated in cache, while remaining data can be placed in "observation" in the watch-list, and later populated in cache if necessary.

In fact, several data subsets can be identified in an incoming ACD. For example, as illustrated in FIG. 4, three types of subsets of data can be identified: (i) a first one (striped segments), which are immediately identified as corresponding to data already cached, and which are accordingly discarded, block S11*b;* (ii) a second one (dotted segments) corresponding to hot data, to be immediately populated in cache (block S11) and (iii) a third one (white segments) corresponding to less hot data, to be placed in the watch-list 12. As it can be realized, subsets (ii) and (iii) above are most efficiently processed and managed if ACD data subsets (i) are first filtered to remove data already residing in cache.

As further illustrated in the cache update logic 10 and the population mechanism 24-25 of FIGS. 3-4, additional data may be placed in the watch-list 12, block S200Ma. These data may for example correspond to local cache miss data, e.g., local read miss or LRM, i.e., data which are representative of cache misses as collected by a local server and this, independently from the ACD received. Accordingly, both the local cache miss data LRM and a data subset of the ACD can be placed in the watch-list and monitored (block S120) to determine which data is to be later populated in cache, block S121. This allows for reacting more accurately and faster to workload changes on the local servers. In this respect, a local client can operate more fine-granular fragments instead of extents (e.g., 1 MB instead of 1 GB, as illustrated in FIG. 4). Now, if a single fragment appears to be "hot" in a whole extent, the hotness of the extent to which that fragment belongs and which is observed at the central system CS may not be high enough for it to be marked as hot (or, even, to be aggregated) in the ACD. Yet, this "hot" fragment may independently be added to the watch-list for in-situ monitoring, making it possible for it to be subsequently populated in cache. Other reasons for which the central system might not "see" enough cache misses are that the particular data is only accessed by one local server, or it had not been seen in the past, hence the historical data has not enough weight. In addition, it typically takes some time until ACD is provided by the central system to the local servers. Thus, independently feeding the LRM to the watch-list 12 for subsequent monitoring can help to improve reactivity and/or sensitivity.

Concerning now how the data in the watch-list are monitored, this can notably be carried out using a circular list 12*a* of cached objects. In particular, an efficient algorithm consists of evicting an oldest cached object from the circular list 12*a*. provided that this oldest cached object has not been requested to be accessed during a given period of time, e.g., a last clock round. This can for example be implemented using a modified version of the Clock algorithm. In the present context, this algorithm can be implemented such as to keep a circular list of cached objects in memory, with an iterator (the "clock hand"), pointing to the oldest page in the list. For each page the algorithm maintains a reference bit, which when set denotes that the page has been accessed during the last Clock round. When a cache miss occurs and if there is no free space in the cache (i.e., the cache is full), the reference bit is inspected at the hand's location. If that bit is 0 (i.e., "unset"), the cached object to which the "hand" points is evicted and the empty page frame can thus be allocated to an incoming page. Otherwise, the reference bit is cleared and the clock hand is incremented, so that it points to the next page in the circular list. The process is repeated until a "victim" page is found. In variants, other page replacement algorithms (First In, First Out (FIFO), Second-Chance, etc.) could be used. However, the above solution (modified Clock algorithm) is an efficient version of FIFO (e.g., more efficient than Second-Chance) because cached objects do not have to be continuously shifted in the list.

So far, embodiments of the invention have been described mainly in terms of method operations. However, according to other aspects thereof, the invention can be embodied as a computerized system, comprising one or more components as described above (i.e., at least a shared data storage system (or a "central system" for short) and/or a local server). Generally speaking, such a computerized system can be suitably configured to perform the method operations imparted to the components.

For example, this computerized system may restrict to shared data storage system CS. The latter may notably comprise:

a receiving unit (not shown) configured to receive cache hit data and cache miss data from each of the local servers LS1, LS2 (independently or not);

an aggregation logic unit (not shown), configured to aggregate at least part of cache hit data received and cache miss data received into the ACD; and an interface (not shown) configured for enabling the ACD to be sent (each of) the local servers LS1, LS2. As touched earlier, the aggregation may be customized, depending on the target server.

Next, this computerized system may similarly restrict to a local server. The latter may notably comprise an interface (not shown) for making cache data available to the central system CS and a receiver unit for receiving aggregated cache data ACD. It may further comprise a cache population logic 10 and cache population tools 24 such as exemplified in FIGS. 3-4.

Of course, the computerized system may comprise both a shared data storage system CS and one or more local servers LS1, LS2, as described earlier.

Finally, the invention can also be embodied as a computer program product, comprising a computer-readable storage medium having computer-readable program code embodied therewith, the program code configured to implement each of the operations of the methods described above. Details of the program code, and algorithmic aspects thereof shall be given in the next section.

The above embodiments have been succinctly described in reference to the accompanying drawings and may accommodate a number of variants, described in reference to any aspect of the invention. In embodiments, several combinations of the above features may be contemplated.

Accordingly, a computerized system 1 according to embodiments of the invention may notably comprise:

a local server LS1 that uses a fast device as cache, e.g. flash based SSD;

a shared data storage server CS providing back-end storage, that uses multiple storage media;

a tiering module T on the storage server to identify hot data and to store hot data on a fast storage medium.

Another example is that of a computerized system 1 comprising notably: one or more local servers LS1, LS2 and a central tiered storage system CS, wherein the central system:

maintains coarse-grained global statistics (based on the consolidated workload observed and aggregated local statistics from local servers), places data to storage media having different performance characteristics based on those coarse-grained global statistics, and
provides coarse-grained cache statistics ACD to individual local servers based on the global statistics,
and wherein each of the local servers:
maintains fine-grained local statistics (based on locally observed workloads); and
populate the local cache according to fine-grained local and coarse-grained global statistics.

Detailed examples of exemplary embodiments are discussed in the next section.

2. Specific Embodiments and Technical Implementation Details

The specific embodiments described below propose a mechanism to coordinate local cache servers and the central cache in a SAN environment. The aim is to improve cache efficiency by leveraging the combination of short- and long-term statistics. The local caches report cache hit statistics (e.g., aggregated to an appropriate granularity, e.g., extent level for use by the central system) to the central system periodically and the central system consolidates the local cache hit statistics together with its own workload statistics (referring to cache misses of local servers, and also historical data corresponding to cache hits and misses of local servers), and makes the consolidated statistics available to each local servers. The consolidated statistics returned to local servers can therefore be tailored for a specific server. Each local server then uses the consolidated statistics to improve local cache performance. The local cache achieves this by leveraging the ability to combine mandatory cache populations from central statistics with selective cache population based on local and central statistics.

The overall architecture is shown in FIG. 1 and has already been discussed in the previous section. The double arrows between local servers LS1, LS2 and the central system CS represent the exchange of statistics which can happen in a periodical or sporadic manner.

The central system can for instance use any cache mechanism CC as known in SAN storage servers. It can also use a tiering T mechanism, or even a combination CC/T of cache and tiering mechanisms. Yet, an automated tiering mechanism is advantageously used (e.g., the IBM EasyTier mechanism) to allocate hot data to faster storage device (e.g., SSD, Flash) and cold data to HDDs or to a fast HDD tier and a slow HDD tier, respectively. The central system can arrange data on the back-end storage in tiers in order for the data to be better optimized for the workload. The cache itself does not comprise a tier, and tiering refers to rearranging data on the back-end storage. As known, back-end storage refers to the actual persistent storage media, e.g., HDDs, where actual data is stored persistently.

In the following, the terminology "central cache" refers to the cache memory of the central system, i.e., the shared data storage system CS. By extension, it may refer to operations governing the central cache and thus to the central system itself. Similarly, "local cache" refers to the cache memory managed by a local server and, by extension, it may refer to operations governing the local cache and thus to the local server itself.

Because all local cache misses of workloads will eventually go to the SAN server for fetching the corresponding data, there is no need for the local servers to report statistics on cache misses (beyond the cache miss requests that are "normally" addressed to the central server). However, in the prior art systems, the local cache hits served from the local caches are not seen in the central server. Therefore, in present embodiments, the local servers are now responsible for collecting statistics on cache hits and report those to the central system.

Recall that since the central system will see all cache misses of each local cache, the central system is capable of combining the cache misses and reported cache hit statistics for each local cache. A similar consolidation mechanism as used for data/data identifiers corresponding to cache misses and data/data identifiers corresponding to cache hits can be used. The central system then makes these statistics available for each local server. This can either be initiated by the local or the central cache:

In a pull model, local servers will initiate a communication to the central system, either for sending the cache-hit statistics or for asking for the consolidated statistics of the central cache.

In a push model, the central system will periodically broadcast the consolidated statistics to the local servers.

The exchange of statistics between the local servers and the central system can be executed "in-band" or "out-of-band". In-band means that the statistics exchange is embedded into the data path through which the application server reads or stores data, e.g. Fibre Channel or SCSI. Out-of-band means that the statistics exchange uses an independent communication channel between the application servers and the SAN storage server.

Often, local caches are designed to exploit local and temporal locality of workloads. With the central system consolidating statistics gathered from all local caches and making them available to each local cache, the cache performance of local caches can be greatly improved, because these statistics represent a central as well as longer-term view on which extents of data are worthy of caching (i.e., the "hot" extents). One possibility to improve local cache performance is to add those extents of hot data as indicated by the CS's statistics unconditionally into the local cache. It is noted that local caches may report cache-hit statistics at a different frequency than the frequency at which the consolidated statistics are received from the central cache.

In the following, local cache designs are disclosed, which utilizes the central statistics to improve caching performance.

In exemplary local cache design embodiments, the local cache reports cache-hit statistics, e.g. the hit count per extent, to the central system and receives consolidated statistics for 1 GB-extents of data in a periodical manner, e.g., every 15 minutes. The local cache may use, e.g., SATA or SAS flash SSDs or PCI-e flash cards as the storage medium on which the cached data will reside. Suppose that the local flash cache organizes the cached data in 1 MB-fragments, then the size of cached entities is 1 MB.

Typically, extents (e.g., 1 GB of data) refer to a number of consecutive fragments (of fixed size). A fragment refers to a fixed size fraction of an extent and to a fixed size multiple of a block. The block size is fixed ab initio in the system. Each of the fractions is typically determined a priori and is therefore not dynamic. Extents and fragments may be the data to be populated next in the local caches (if necessary). Extent/fragment identifiers are used, as described in the previous section, instead of the to-be-populated data. For example identifiers are used at the level of the local cache population logic 10, FIG. 3. In all cases, extent/fragment unambiguously refer to the data to be populated. The distinction between extent/fragment of data and identifiers of extent/fragment of data will accordingly not be made in the following, as they refer to the same data.

Note that in the prior art, an extent is sometimes defined as a contiguous area of storage in a computer file system, reserved for a file. In the present case, "extents" are not necessarily reserved for files but still correspond to a contiguous area of storage space (yet not in a computer file system but in a memory storage system).

In the case of a read-only local cache, i.e., one that only caches unmodified data, when receiving a user read request, the local cache is first queried. If it is a cache hit, data can be read from the local flash cache and sent back to the application. Else (cache miss), the request is forwarded to the SAN storage server. Upon receiving the requested data from the SAN storage server, the data is sent back to the requesting application, and may or may not be populated into the local flash cache depending on its data size or its hotness. Upon a user write request, the old copy of the data in the local cache (if present) is invalidated, and the data is written to the SAN storage server. Clearly, it can happen that for a given read request, only some of the requested data may be found in the cache, that is, part of the request may be a cache hit and part of it a cache miss. This case can be referred to as a "partial hit". In such a case, the local cache may either decide to serve the hit data from the cache and the missed data from the SAN, or serve all the data from the SAN—such a decision would be governed by a strategy, which is referred to as a partial hit strategy. In any case, the aforementioned principles for serving hits and misses still hold for partial hits and partial misses, respectively, since a partial hit can be processed as a miss or as a complementary miss and hit.

As described in the previous section, most of the cache population operations are governed by an asynchronous execution unit 10 (e.g., a dedicated software thread). This means that the actual cache population operations are operated outside of the critical data path. FIG. 3 shows the overall procedure of asynchronous logic population involving various components of the local cache administration, notably the cache population logic 10 (the latter including filter 11, watch-list 12, queues 21, 22 and scheduler 23), data mover 24, direct attach storage (DAS) flash cache 26, and cache directory 25.

The hot list ACD received at block S400 and local read misses LRM received at S200Ma are respectively sent to the filter 11 and watch-list 12. Based on the hot list ACD and local read misses LRM received, the population logic 10 generates a sequence of cache population requests (blocks S11, S121). The cache population requests are sent to two queues 21, 22, which are processed by the data mover 24 asynchronously, as discussed in the previous section. Also, the queues are processed at a lower priority and/or at limited bandwidth compared to normal user read/write requests. The two queues may be served with a strict priority scheduler 23. Yet, in variants, only one queue could be used instead. However, having two queues brings data more likely to be hit in the future faster into the cache and makes it easier to manage requests with high priority, as the high-priority requests can be placed in one queue and lower-priority requests can be placed in the other queue. Next, the data mover 24 will read the data retained for cache population from the SAN storage server CS (blocks S450) and store it on direct attach storage (DAS) cache 26 (block S550); the cache directory 25 is accordingly updated, block S560. The cache directory 25 may otherwise be updated whenever the local server LS confirms a local read hit, block S200Ha. As explained earlier, the filter 11 may proceed to filter out those data already in cache, block S11b. see also FIG. 4. While the hottest data fragments are instructed to be directly populated in cache (S11), the less hot data fragments are sent to the watch-list 12, block S11a.

Thus, the SAN storage server CS is needed on several occasions: a first time (block S400) to provide the aggregated cache data information ACD, i.e., the global statistics, and a second time (S450) to query the actual data corresponding to those data retained for cache population, if needed. Indeed, in the embodiment of FIG. 3, the population logic 10 makes decisions based on data identifiers instead of actual data, making block S450 necessary in that case. This makes it possible to markedly reduce the quantity of ACD data forwarded to local servers, as not all of the data identified in the ACD data shall be locally cached. Of course, in variants, actual data could be sent together with the ACD, in which case blocks S450 would not be necessary anymore. Finally, the system CS is also needed to respond to "usual" cache miss requests from local servers; this point is not explicitly shown in the drawings but the corresponding operations are similar to blocks S450, S550 and S560 in FIG. 3.

FIG. 4 shows a detailed procedure for a local server that uses central statistics ACD, i.e., the hot extent list ACD sent by the SAN storage server CS, to make cache population decisions. As illustrated in FIG. 4, the SAN storage server CS will generate an ordered list of extents ACD, i.e., wherein data extents are sorted according to their hotness. This is achieved by combining current and past cache hits as well as cache miss statistics. Each of the extents in the ACD represents a list of consecutive fragment identifiers that might later be populated or not. Upon receiving the ordered list of hot extents ACD, the local cache will first filter fragment identifiers out of those fragments that are already in the cache, i.e., already present in the cache or in the process of population, block S11b. The left-over fragment identifiers (i.e., identifiers of non-resident fragments) likely include a few "very hot" fragment identifiers (dotted rectangular segments): these are directly sent (block S11) to the population queue 21. Queues 21, 22 of FIG. 3 are served with a strict priority scheduler 23. The population logic execution unit 10 will take and execute those population requests asynchronously.

There are several possible mechanisms to determine the number of fragments that are 'very hot'; the amount of very hot fragments is variable. It would need to be adjusted if for example the data in the advice list ACD is entirely due to a predicted or application initiated event, in which case it is just needed to populate the fragments regardless of metrics or workload. Note that such a fragment identifier could already be in the population watch list. In that case it is beneficial to remove it from the watch list. The remaining less hot fragment identifiers are inserted into the population watch list 12, operated by a modified version of the Clock algorithm, to find out fragments that are worthy of population, i.e., according to certain rules.

In addition and as already touched earlier, there can other streams (S200Ma) of fragment identifiers that may be added into the population watch list 12, e.g., any fragment identifier LRM that has recently seen a read miss.

In further detail, a reference pseudo-hit count C may be kept for each fragment identifier in the watch list 12. The population watch-list can be managed as follows: upon arrival of a fragment identifier at the population watch-list, it is first checked whether the fragment identifier is already in the population watch-list or not.

This is independent whether the fragment identifier came from the ordered list of hot extents or resulted from a read miss or another source. Hence, If the fragment identifier is a read miss and resulted in a pseudo-hit on the watch list, its pseudo-hit count C is incremented by 1. Further, If its pseudo-hit count C is greater than (or equal to) a threshold T, the fragment identifier is taken out of the watch list and put into population queue (block S121).

Now, if the fragment identifier comes as part of the central system advice ACD and is in the watch list, then nothing particular is to be done in that case. The intent is to not increment the pseudo-hit counter for ACD advices, i.e., a pseudo-hit only occur for local read misses LRM, such that cold fragments in the ACD list will not get an extra hit compared to local read misses LRM.

If the fragment identifier is not yet in the watch list 12, a replacement procedure is started by moving the clock 12a hand through a circular buffer and performing the following operations in a loop:

If the pointed element is free the slot is taken by the incoming fragment identifier and its hit count is initialized to 0. The procedure then stops.

If the pointed element has a low hit count (e.g., some value close to 0 or a fraction of T) compared to the average hit count in the non-resident clock, it is removed, and its slot is taken by an incoming fragment with its hit count initialized to 0. The procedure then stops.

Otherwise, the reference count of the pointed fragment identifier is re-set, or divided by a decay factor (such as 2 or 3), and then the clock hand moves to the next element.

Generally the loop can be performed until the new fragment identifier has found a place in the watch list. Alternatively it can be stopped after a certain number of clock hand moves to limit processing cycles spent. In the latter case one has to decide in the last round which fragment identifier (the new fragment identifier or the one at the current clock hand position) is kept and which one dropped. The decision can be a function of the current C and T values.

The threshold T can be set as a configurable value, e.g., 3. This value can be refined by trial-and-error. As this value impacts the cache performance, use is made of a method to set an adaptive threshold as follows.

Given that resident fragments are managed by another Clock 24a based on their reference count, the adaptive threshold method shall keep track (block S580) of the (moving) average of reference count of the most-recently evicted fragments, say Ce, that was evicted at block S570.

Then, the clock moving speed is measured for both clocks (i.e., the clock for resident data 24a and the clock 12a for non-resident data, i.e., in the watch list).

For example: during a given period of time, the resident clock 24a moves Nr rounds, while non-resident clock 12a moves Nn rounds. The threshold T is then set to Ce Nr/Nn.

Recall that by definition T is the reference-count threshold for populating non-resident fragments into the local cache. By setting T=Ce Nr/Nn, the fragments entering the local cache 26 are expected to be more beneficial compared to the fragments evicted.

In an extreme case, it could happen (at least theoretically) that there are no population requests for a period of time, and T is then set to zero because Nr=0. This is not desirable because cold fragments are allowed to be populated. In order to avoid this extreme case, the population logic will enforce a minimum population speed, namely, for a given time period, the population logic will issue at least Tf fragment-population requests, where Tf is a pre-defined small number.

In order to populate a non-resident fragment, one resident fragment from the local cache has to be evicted if the cache is full. The resident fragment to be evicted is chosen by an eviction algorithm. In one embodiment, the Clock algorithm is used, where for each resident fragment, a reference count is used to record cache hits. Those fragments with few hits are evicted once they are pointed by the clock hand. However, the SAN storage server or the application may dictate that specific fragments will not be considered for eviction by the eviction algorithm (e.g., fragments identified by the SAN storage server as "very hot", i.e., "must-have"). Those "very hot" fragments will stay in the local cache as long as dictated by the SAN Storage Server. This can be achieved using a single bit for each resident fragment that indicates whether the fragment is pinned (i.e., it cannot be removed from the cache). For completeness, the resident Clock 24a uses the same algorithm as the non-resident Clock 12a to reset or decay reference counts for fragments that are passed up, because the references counts are not low.

Next considerations as to computer-program code embodiments follow.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory, so as to operate properly in connection with the OS. Furthermore, the methods can be written as an object oriented programming language, which has classes of data and methods, or a procedure programming language, which has routines, subroutines, and/or functions.

As will be appreciated by one skilled in the art, aspects of the present invention may be embodied as computerized systems, methods or computer program products. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. Depending on the aspect of the invention concerned, the program code may execute entirely on one local server, partly thereon, and partly on a remote local server. It may execute partly on a local server and partly on a central system or entirely on the central system.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In that respect, not all the components/operations depicted in the accompanying drawings need be involved, depending on the chosen embodiments. In addition, many other variants than explicitly touched above can be contemplated. For example, the central server may implement a tiering mechanism alone, i.e., without a cache mechanism. As another example, each of the local servers LS1, LS2 may assembles fine-grained local statistics into coarse-grained statistics, in order to make it available to the central system CS in a format better suited for the central system.

The invention claimed is:

1. A method for managing cache memories, the method comprising:
   providing a computerized system comprising a shared data storage system (CS) and several local servers, wherein the shared data storage system is configured to interact with the local servers, the local servers serve applications using respective cache memories, and each of the local servers accesses data stored in the shared data storage system;
   providing cache data information from each of the local servers to the shared data storage system, the cache data information comprising cache hit data representative of cache hits of each of the local servers; and cache miss data representative of cache misses of each of the local servers;
   aggregating, at the shared data storage system, at least part of the cache hit data and the cache miss data received into aggregated cache data information and providing the aggregated cache data information to one or more of the local servers; and
   at the one or more of the local servers, updating respective one or more cache memories used to serve respective one or more applications based on the aggregated cache data information provided;
   wherein updating a cache memory is carried out asynchronously with respect to requests to the cache memory from a respective application served by a respective local server.

2. The method according to claim 1, wherein aggregating further comprises sorting the cache hit data and the cache miss data according to occurrences of the cache hit data and the cache miss data, such that a structure of the aggregated cache data information obtained reflects the sorting.

3. The method according to claim 1, wherein updating a cache memory comprises selecting subsets of data in the aggregated cache data information and populating the cache memory according to the selected subsets of data.

4. The method according to claim 3, wherein updating a cache memory comprises selecting at least two distinct subsets of data in the aggregated cache data information; instructing to populate, without delay, the cache memory with data corresponding to one of the distinct subsets of data; and instructing to place data corresponding to another one of the distinct subsets of data in a watch-list, and wherein the method further comprises:

monitoring data in the watch-list to determine data to be populated in the cache memory; and     populating the data accordingly determined in the cache memory.

5. The method according to claim 3, wherein the method further comprises:

instructing to place additional data corresponding to local cache miss data in the watch-list, the local cache miss data being representative of cache misses collected by the local server independently from the aggregated cache data information, such that both the local cache miss data and the data corresponding to the second one of the two distinct subsets of data can be monitored to determine which data is to be populated in the cache memory.

6. The method according to claim 4, wherein the watch-list comprises a circular list of cached objects and monitoring data in the watch-list comprises evicting an oldest cached object, which has not been requested to be accessed during a given period of time, from the circular list.

7. The method according to claim 4, wherein the method further comprises filtering data that already reside in cache memory before populating a cache memory with such data.

8. The method according to claim 1, wherein aggregated cache data information are aggregated at a granularity larger than a granularity used at any subsequent updating of cache memory.

9. A shared data storage system, configured to perform the method according to claim 1.

10. A computerized system, comprising the shared data storage system according to claim 9.

11. A server, configured to perform each of the steps performed by a single local server in the method according to claim 1.

12. A computer program product for managing cache memories, the computer program product comprising a non-transitory computer-readable storage medium having computer-readable program code embodied therewith, the computer-readable program code configured to implement the method according to claim 1.

* * * * *